United States Patent Office 2,754,229
Patented July 10, 1956

2,754,229

METHOD OF RENDERING MATERIAL RODENT REPELLENT BY ISOPROPYL PENTACHLOROPHENYL CARBONATE

Robert H. Fredenburg, Barberton, and William E. Bissinger, Akron, Ohio, assignors to Columbia-Southern Chemical Corporation No Drawing. Application July 31, 1952,
Serial No. 301,972

3 Claims. (Cl. 117—138.5)

This invention relates to a novel compound, isopropyl pentachlorophenyl carbonate, and it has particular relation to the use of this compound as a rodent repellent.

Isopropyl pentachlorophenyl carbonate may be prepared by reacting an isopropyl haloformate, such as isopropyl chloroformate, with pentachlorophenol. The reaction is carried out in the presence of a basic agent and an organic solvent for the mixture, such as ethylene dichloride, which solvent is inert with respect to the reaction mixture and insoluble in water.

During the reaction for the production of this ester, there is an evolution of hydrogen halide, such as HCl, which must be removed. Several expedients may be provided to facilitate such removal. For example, the reaction may be conducted in the presence of a strong basic agent, including organic bases such as pyridine and dimethyl aniline, quaternary ammonium bases such as trimethyl phenyl ammonium hydroxide, or inorganic bases such as the oxides, hydroxides, carbonates, and bicarbonates of sodium, potassium, barium, strontium, and magnesium or other alkaline earth metal or alkali metal which will react with and remove the liberated HCl.

The reaction is carried out at a temperature above the freezing point of the mixture but below 15° C., usually 0° C. to 10° C., in the presence of an inert organic solvent and a strong basic agent. Inert organic solvents are those which are free from hydroxy or amino groups. Those which are suitable include benzene, toluene, xylene, gasoline, kerosene, ketones such as acetone, halogenated hydrocarbons such as ethylene dichloride, perchloroethylene, carbon tetrachloride, chloroform, etc., and ethers containing up to about 10 carbon atoms.

A preferred procedure is to place pentachlorophenol and the inert organic solvent in the reactor and add both isopropyl chloroformate and the basic agent dropwise and simultaneously to the reaction mixture while stirring at an appropriate reaction temperature, e. g., between 5° C. and 10° C. It is also possible to carry out the reaction by adding isopropyl chloroformate to a mixture of pentachlorophenol, a basic agent and an inert organic solvent. Likewise, the solvent and isopropyl chloroformate may be slowly added to a reaction mixture of pentachlorophenol and basic agent.

Although, it is only necessary to employ equimolecular proportions of the isopropyl chloroformate, basic agent and pentachlorophenol, it is frequently preferable to employ an excess, for example, up to 5 to 20 per cent by molar ratio of isopropyl chloroformate, and a similar excess of basic agent. It is, of course, to be understood, that molar ratios of the reactants in the preparation of isopropyl pentachlorophenyl carbonate may be varied somewhat.

The following example illustrates one suitable method for preparing the novel compound.

Example I

A solution prepared by dissolving 132.5 grams (0.5 mole) of pentachlorophenol in 300 milliliters of ethylene dichloride was placed in a one-liter, three-necked reaction flask equipped with a thermometer, stirrer and two dropping funnels. The mixture was cooled to between 5° C. to 10° C. Then, 67.0 grams (0.5 mole) of isopropyl chloroformate and 41.5 grams (0.525 mole) of pyridine were added dropwise over a period of several minutes from each dropping funnel while maintaining a reaction temperature of 5° C. to 10° C. and stirring the reaction mixture. Stirring was continued for an hour after the conclusion of the addition of pyridine and isopropyl chloroformate. At the conclusion of the stirring, 250 milliliters of water were added to dissolve the pyridine hydrochloride formed during the reaction. The organic phase was separated, washed once with an equal volume of diluted aqueous hydrochloric acid solution, containing one per cent by weight of HCl, and twice with an equal volume of water.

The solvent was removed by distillation at a pressure of 10 millimeters mercury and a temperature of 100° C. The residue was purified by recrystallization from ethyl alcohol, providing 171.8 grams of isopropyl pentachlorophenyl carbonate which represented a 97.4 per cent theoretical yield.

Analysis of the purified compound showed a chlorine content of 50.2 per cent by weight as compared with a calculated percentage for isopropyl pentachlorophenyl carbonate of 50.3 per cent by weight. The compound was a tan solid having a melting point of 67–68° C. It is essentially insoluble in water, and it is readily miscible with many organic solvents such as acetone, toluene, alcohols, and the like.

Isopropyl pentachlorophenyl carbonate has been found to be a valuable rodent repellent. It was subjected to a standard rodent repellency test and found to have an extremely high degree of repelency.

The following test which has been performed demonstrates the effectiveness of this compound as a rodent repellent.

Rats were allowed to feed at liberty on bait containing two per cent by weight of isopropyl pentachlorophenyl carbonate and untreated bait. The amounts of bait, treated and untreated, eaten by each rat during the course of several days were carefully observed. The results of these experiments showed that the rats displayed a decided preference for the untreated bait eating substantially none of the treated bait when untreated bait was available. Further, the rats refused to accept the treated bait in any amount approaching their normal consumption even when no untreated bait was available.

Various expedients may be employed to utilize isopropyl pentachlorophenyl carbonate as a rodent repellent. The compound may be used to protect anything attacked or destroyed by rodents. It may be deposited as a solid or liquid formulation over areas needing protection. Materials which may be coated or impregnated include natural and synthetic cellulosic materials, such as wood, boxboard, paper, particularly wrapping paper, textiles, such as cottons and rayons. Films of polyvinyl alcohol, polyethylene, polyvinyl acetate and copolymers of vinyl alcohol and vinyl acetate, for example, may also be treated with this compound. Hemp or sisal products, for example rope, may likewise be protected from rodents by treatment with isopropyl pentachlorophenyl carbonate.

Various forms of these materials may be treated. Thus, non-woven and woven forms as well as strands, yarns and fibers of appropriate materials may be rendered rodent repellent by treatment with isopropyl pentachlorophenyl carbonate. Shipping containers such as bags, for example, may be advantageously treated with this compound.

Impregnation or coating may be accomplished by any of the recognized techniques, spraying, immersion, roller coating, etc. The compound may be appropriately formulated in liquid or solid compositions, as hereinafter described, for use in coating or impregnating processes. Treatment of sheet material, e. g., paper, conveniently is effected by roller coating, whereas rope normally is passed lengthwise through a bath of a liquid composition of isopropyl pentachlorophenyl carbonate in an immersion process.

In the case of certain of these materials such as the films of polyvinyls, isopropyl pentachlorophenyl carbonate may be incorporated in the film before the film is formed. The same is possible with cellulosic materials such as paper wherein isopropyl pentachlorophenyl carbonate may be added to the beater pulp.

The exact amount of the compound required to adequately protect these various materials varies considerably. Even traces of the compound provide beneficial results. The presence of from 1 to 2 per cent, or more, of isopropyl pentachlorophenyl carbonate, based on the weight of the material to be coated or impregnated is satisfactory.

It is also possible to make use of the rodent repellency properties of isopropyl pentachlorophenyl carbonate by incorporating appropriate amounts thereof in paints. Thus, the addition of at least about 1 per cent by weight of this compound in a conventional paint with which it is compatible will provide advantageous rodent repellent conditions in areas which are painted therewith.

Isopropyl pentachlorophenyl carbonate may be formulated in either liquid or solid formulations. It may be prepared as a liquid formulation by dissolving it with a suitable hydrocarbon solvent, such as xylene, toluene, gasoline, kerosene or other hydrocarbon having a density lower than that of water or with alcohols, ethers, ketones, and esters containing up to about 10 carbon atoms which are commonly used as industrial solvents, such as ethyl alcohol, methyl alcohol, isopropyl alcohol, butyl alcohol, ethyl ether, acetone, etc. The concentration of solvent added varies from 2 or 3 per cent to 80 to 90 per cent by weight of the final formulation, depending in part upon the degree of temperature stability required.

The extent of addition of solvent to isopropyl pentachlorophenyl carbonate is limited by the solubility of the solvent and the carbonate at the temperature at which stability is desired. Thus, at room temperature, 20° C., a solution of about 10 per cent by weight of isopropyl pentachlorophenyl carbonate and 90 per cent by weight of kerosene makes a perfect solution, but any decrease in the concentration of kerosene results in a two-phase system. On the other hand, xylene and isopropyl pentachlorophenyl carbonate are miscible in all proportions, and any desired concentration of the carbonate in xylene may be used.

A surface active or wetting agent is generally added to the solvent and isopropyl pentachlorophenyl carbonate to produce an emulsifiable system when added to water. Suitable wetting agents are sodium alkylaryl sulfonates, sulfonated dicarboxylic acid esters, such as dioctyl sodium sulfosuccinate or equivalent ester of an alkyl alcohol containing up to 8 carbon atoms, alkyl naphthalene sulfonic acid or sodium salt, thereof, etc. Such an emulsifiable system may be mixed with water to form an aqueous dispersion containing about 0.1 to 5.0 per cent by weight of isopropyl pentachlorophenyl carbonate. The concentration of the wetting agent is usually between 5 to 30 per cent by weight of solvent and isopropyl pentachlorophenyl carbonate, depending upon the amount necessary to maintain an emulsion.

One of the considerations in the choice of the ingredients and concentrations thereof in the above formulation and in all formulations is the achievement of an emulsifiable system having a density substantially the same as that of water so that when the system is mixed with water, the tiny emulsion droplets will remain well dispersed, having no tendency to rise or fall in the aqueous dispersion. A formulation comprising isopropyl pentachlorophenyl carbonate and a solvent therefor, said formulation having a density which does not vary more than 5 per cent of the density of water, is considered to be desirable.

Consequently, the emulsion preferably should comprise water, the isopropyl pentachlorophenyl carbonate, and an amount of a solvent for the carbonate (hydrocarbon, etc., disclosed above, of lower density than water), the amount of the solvent being sufficient to establish the density of a mixture of the carbonate ester and the solvent substantially the same as the density of water (±5 per cent).

Where aqueous solutions rather than emulsions are desired, the mixture of water and carbonate ester should contain a water soluble solvent for the ester, such as an alcohol or acetone, in amount sufficient to ensure solution of the ester.

Isopropyl pentachlorophenyl carbonate may be prepared as a solid or dust formulation. Such a formulation can be prepared by heating isopropyl pentachlorophenyl carbonate to form a liquid, and then spraying it onto a highly absorptive solid diluent, such as highly absorptive silica. The coated diluent is then further diluted by blending with a solid diluent, such as clay, talc, silica, bentonite, diatomaceous earth, chalk, wood flour, etc., to produce a finished dust containing about 5 to 25 per cent by weight of the carbonate. The solid formulations may be made wettable by the addition of a suitable wetting agent, such as described above with respect to liquid formulations.

A solid formulation may be prepared by grinding isopropyl pentachlorophenyl carbonate in a hammer mill with any of the above solid diluents.

Although the present invention has been described with reference to the specific details of certain embodiments thereof, it is not intended that such details shall be regarded as limitations upon the scope of the invention, except insofar as included in the accompanying claims.

What is claimed:

1. A method of rendering a material subject to attack by rodents rodent repellent which comprises treating said material with a rodent repellent concentration of isopropyl pentachlorophenyl carbonate.

2. The method of claim 1, wherein rope is the treated material.

3. The method of claim 1 wherein paper is the treated material.

References Cited in the file of this patent

UNITED STATES PATENTS

| | | |
|---|---|---|
| 2,430,017 | Houk | Nov. 4, 1947 |
| 2,510,025 | Moyle | May 30, 1950 |
| 2,567,987 | Baumgartner | Sept. 18, 1951 |